United States Patent
Gollmer et al.

(10) Patent No.: US 10,710,444 B2
(45) Date of Patent: Jul. 14, 2020

(54) HYBRID DRIVE FOR A HYBRID VEHICLE

(71) Applicant: Bayerische Motoren Werke Aktiengesellschaft, Munich (DE)

(72) Inventors: Roland Gollmer, Diessen (DE); Michael Etzel, Munich (DE); Ulrich Ohnemus, Hattenhofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 181 days.

(21) Appl. No.: 15/970,016

(22) Filed: May 3, 2018

(65) Prior Publication Data
US 2018/0244143 A1 Aug. 30, 2018

Related U.S. Application Data

(63) Continuation of application No. PCT/EP2016/075503, filed on Oct. 24, 2016.

(30) Foreign Application Priority Data
Nov. 6, 2015 (DE) .................. 10 2015 221 779

(51) Int. Cl.
| | |
|---|---|
| *B60K 6/365* | (2007.10) |
| *B60K 6/48* | (2007.10) |
| *B60K 6/383* | (2007.10) |
| *B60K 6/442* | (2007.10) |
| *B60K 6/547* | (2007.10) |

(52) U.S. Cl.
CPC .............. *B60K 6/365* (2013.01); *B60K 6/48* (2013.01); *B60K 6/383* (2013.01); *B60K 6/442* (2013.01); *B60K 6/547* (2013.01); *B60K 2006/4825* (2013.01); *B60K 2006/4841* (2013.01); *Y02T 10/6221* (2013.01); *Y02T 10/6234* (2013.01); *Y02T 10/6252* (2013.01)

(58) Field of Classification Search
CPC .......... B60K 6/442; B60K 6/365; B60K 6/48; B60K 6/383
See application file for complete search history.

(56) References Cited

U.S. PATENT DOCUMENTS

| | | | |
|---|---|---|---|
| 6,317,665 B1 * | 11/2001 | Tabata .................. | B60K 6/387 701/22 |
| 6,394,924 B1 | 5/2002 | Schiebold et al. | |

(Continued)

FOREIGN PATENT DOCUMENTS

| | | |
|---|---|---|
| CN | 101022967 A | 8/2007 |
| CN | 101896388 A | 11/2010 |

(Continued)

OTHER PUBLICATIONS

International Search Report (PCT/ISA/210) issued in PCT Application No. PCT/EP2016/075503 dated Jan. 20, 2017 with English translation (seven pages).

(Continued)

*Primary Examiner* — Derek D Knight
(74) *Attorney, Agent, or Firm* — Crowell & Moring LLP

(57) ABSTRACT

A hybrid drive for a hybrid vehicle is provided. The hybrid drive includes an internal combustion engine having a crankshaft, and an electric motor. The electric motor is coupled to the crankshaft of the internal combustion engine by way of an automatically shifting transmission.

18 Claims, 2 Drawing Sheets

(56) References Cited

U.S. PATENT DOCUMENTS

| | | |
|---|---|---|
| 2008/0227592 A1 | 9/2008 | Steffen et al. |
| 2009/0176611 A1 | 7/2009 | Avery |
| 2010/0292046 A1 | 11/2010 | Kaltenbach |
| 2016/0082821 A1 | 3/2016 | Mueller et al. |

FOREIGN PATENT DOCUMENTS

| | | |
|---|---|---|
| DE | 199 15 926 A1 | 3/2000 |
| DE | 199 31 963 A1 | 1/2001 |
| DE | 10 2006 037 577 A1 | 2/2008 |
| DE | 10 2006 037 576 A1 | 4/2008 |
| DE | 10 2010 032 007 A1 | 3/2011 |
| DE | 10 2013 005 720 A1 | 6/2014 |
| DE | 10 2013 105 026 A1 | 11/2014 |
| WO | WO 2015/099599 A1 | 7/2015 |

OTHER PUBLICATIONS

German-language Written Opinion (PCT/ISA/237) issued in PCT Application No. PCT/EP2016/075503 dated Jan. 20, 2017 (seven pages).

German-language Search Report issued in counterpart German Application No. 10 2015 221 779.5 dated Sep. 1, 2016 with partial English translation (11 pages).

Chinese-language Office Action issued in counterpart Chinese Application No. 201680041360.3 dated Oct. 9, 2019 with English translation (15 pages).

* cited by examiner

HYBRID DRIVE FOR A HYBRID VEHICLE

CROSS REFERENCE TO RELATED APPLICATIONS

This application is a continuation of PCT International Application No. PCT/EP2016/075503, filed Oct. 24, 2016, which claims priority under 35 U.S.C. § 119 from German Patent Application No. 10 2015 221 779.5, filed Nov. 6, 2015, the entire disclosures of which are herein expressly incorporated by reference.

BACKGROUND AND SUMMARY OF THE INVENTION

The invention relates to a hybrid drive for a hybrid vehicle.

Hybrid drives are used in modern motor vehicles, wherein, for example, an internal combustion engine and an electric motor are provided in the drivetrain of a vehicle. Here, it is sought to operate the engine and motor as efficiently as possible.

It is an object of the invention to specify an improved hybrid drive for a hybrid vehicle.

This and other objects are achieved by way of a hybrid drive for a hybrid vehicle, including an internal combustion engine which has a crankshaft, and including an electric motor, wherein the electric motor is coupled to the crankshaft of the internal combustion engine by way of an automatically shifting transmission, according to embodiments of the invention.

For example, the electric motor provides, in a simple manner, the starting functionality for the internal combustion engine, and said electric motor can furthermore be operated as a generator. Accordingly, the electric motor can assist the run-up of the crank drive or of the crankshaft, in order to realize as smooth and excitation-free a run-up as possible. Above a certain rotational speed of the internal combustion engine, the electric motor can be switched into the generator mode, and can itself be driven by the internal combustion engine.

Regulated motor operation of the electric motor is preferably implemented.

In particular, the electric motor may be designed to realize all starting requirements, in particular low-temperature starts of the internal combustion engine.

The electric motor may serve for permitting automatic starting and stopping, in the case of which the internal combustion engine must be shut down and reactivated after a certain period of time. This may be after the vehicle comes to a standstill, for example at a traffic signal, though may also be during coasting, that is to say when the vehicle is rolling without being driven by the internal combustion engine. The starting of the internal combustion engine must in this case satisfy extremely high demands with regard to comfort.

The hybrid drive may be such that, downstream of the internal combustion engine, there are connected a system for compensating the rotational speed non-uniformity of the crankshaft, a characteristic converter, and a multi-gear-ratio vehicle transmission, for the purposes of transmitting the power of the internal combustion engine to wheels, which are to be driven, of a vehicle. In this way, an efficient and as far as possible excitation-free transmission of power to the wheels of the vehicle to be driven is possible. It is self-evident that further components, such as for example a differential, may be incorporated into the drivetrain.

The vehicle transmission may be an automatic transmission or a manually shiftable transmission. In particular, it is thus possible for inexpensive and reliable manually shiftable transmissions to be incorporated into the hybrid drive and combined with the internal combustion engine and electric motor in a modular system. In this way, cost advantages are obtained in relation to already known hybrid solutions, because extensively tested and inexpensive manual shift transmissions can be used. Alternatively, automatic transmissions such as those installed in conventional vehicles with an internal combustion engine may be used.

In one refinement of the hybrid drive, a further electric motor is incorporated between the characteristic converter and the vehicle transmission. The additional electric motor may serve for electric driving, electric crawling and the recuperation of braking energy, or else for "boosting" when the internal combustion engine is at a standstill.

The internal combustion engine may be arranged coaxially or axially parallel with respect to a transmission input shaft of the vehicle transmission, such that, in accordance with the available structural space, the electric motor can be positioned optimally in a vehicle.

The use of two electric motors in a hybrid drive has the advantage that the hybrid functions relating to the internal combustion engine and the hybrid functions relating to the drive or vehicle transmission can be divided between two separate electric motors, such that said motors can each be optimally dimensioned with regard to their intended functionality in the drivetrain.

The additional electric motor may in particular be couplable via a transmission to the transmission input shaft of the vehicle transmission, in order to operate the electric motor as efficiently as possible.

The automatically shifting transmission assigned to the electric motor relating to the internal combustion engine may, in one refinement of the hybrid drive, have a planetary transmission. By way of the planetary transmission, even high transmission ratios can be provided in a compact manner.

Alternatively or in addition, the automatically shifting transmission may have shift elements which are actuable by way of an actuator, wherein the actuator is in particular controllable by a control unit.

For example, the control unit may actuate the actuator in a manner dependent on an operating parameter in the drivetrain, in particular the rotational speed of the internal combustion engine or the like, in order to effect a gear ratio change in the automatically shifting transmission.

It is thus possible in particular for a gear ratio change in the automatically shifting transmission, and a switch from the motor mode to the generator mode, to be performed as soon as a rotational speed of the internal combustion engine predefined in the control unit is exceeded during the run-up of the crank drive. Such functionality is preferably implemented fully automatically, without any action on the part of the driver.

In a further refinement of the hybrid drive, the planetary transmission has an internal gear, which is assigned a first freewheel, and a sun gear, which is assigned a second freewheel. The freewheels serve for permitting a switch of the electric motor from the motor mode to the generator mode, wherein a reversal of the torque flow from the internal combustion engine to the electric motor is made possible by way of the freewheels.

The input and output of drive may be realized via the sun gear and via a planet carrier of the planetary transmission in the motor mode of the electric motor.

The input and output of drive may be realized with static planet gears of the planetary transmission in the generator mode.

The automatically shifting transmission may have an output shaft which may be coupled in particular via a gearwheel pairing to the crankshaft of the internal combustion engine. In this way, the electric motor can be connected into the hybrid drive in a compact manner, wherein an additional transmission ratio can be provided by way of the gearwheel pairing.

The gearwheel pairing may be a spur-gear stage, wherein it is possible in an inexpensive manner to use known toothings.

In order to take up as little structural space as possible, it may be provided that the automatically shifting transmission is a transverse transmission.

In a further refinement, the hybrid drive is characterized in that a first gear ratio of the automatically shifting transmission has a transmission ratio in a range from 1.5 to 2.5, in particular from 1.7 to 2.3, preferably from 1.9 to 2.1, and a second gear ratio of the automatically shifting transmission has a transmission ratio in a range from 3.5 to 4.5, in particular from 3.7 to 4.3, preferably from 3.9 to 4.1.

For example, the transmission ratio of the first gear ratio may be equal to 2, and the transmission ratio of the second gear ratio may be equal to four.

In the present case, a transmission ratio of four means that an input rotational speed introduced into the automatically shifting transmission at the electric motor side is converted by way of the transmission into an output rotational speed in accordance with the specification i=4=input rotational speed/output rotational speed.

Here, the first gear ratio may serve for the generator mode, and the second gear ratio may serve for the motor mode. The lower transmission ratio for the generator mode ensures that the electric motor is not overloaded even during the rundown of the internal combustion engine.

It is self-evident that the above-mentioned transmission ratios represent the overall transmission ratio for the automatically shifting transmission. For example, if a planetary transmission is combined with a spur-gear stage, wherein the spur-gear stage serves for the connection of the transmission to the crankshaft, the overall transmission ratio is defined by the transmission ratio of the spur-gear stage and the transmission ratio of the respective gear ratio of the planetary transmission.

To realize a reliable and practical embodiment of the automatically shifting transmission, the transmission ratio of the second gear ratio may correspond at least to 1.5 times, in particular at least two times, the transmission ratio of the first gear ratio.

The spur-gear stage may have a transmission ratio in a range from 1.5 to 2.5. In particular, the transmission ratio of the spur-gear stage may be equal to 2.

The planetary transmission may have a transmission ratio of 1 in the first gear ratio, and a transmission ratio in a range from 1.5 to 2.5, in particular from 1.7 to 2.3, preferably from 1.9 to 2.1, in the second gear ratio.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
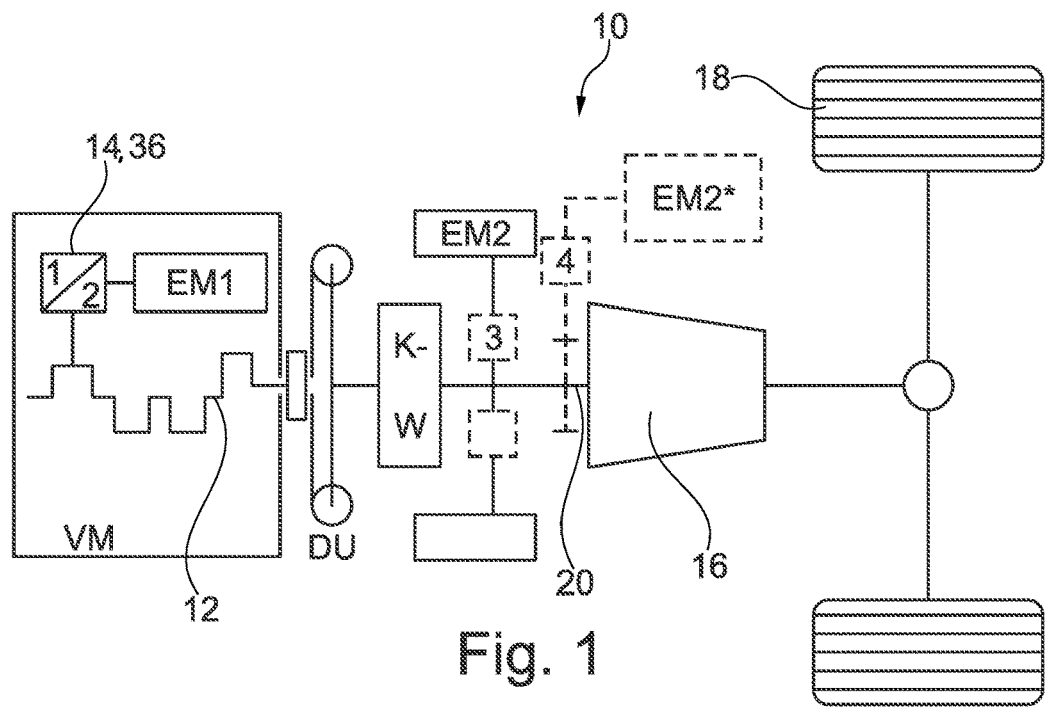
FIG. 1 is a schematic view of a hybrid drive according to an embodiment of the invention.

FIG. 1 illustrates a hybrid drive 10 for a hybrid vehicle. The hybrid drive 10 has an internal combustion engine VM, which has a crankshaft 12, and an electric motor EM1. The electric motor EM1 is coupled to the crankshaft 12 of the internal combustion engine VM by way of an automatically shifting transmission 14.

Downstream of the internal combustion engine VM, there are connected a system DU for compensating the rotational speed non-uniformity of the internal combustion engine VM, a characteristic converter KW, which serves as launch clutch, and a multi-gear-ratio vehicle transmission 16, for the purposes of transmitting the power of the internal combustion engine VM to the wheels 18, which are to be driven, of the vehicle to be driven.

The characteristic converter KW may be a hydrodynamic converter or a dry-running or wet-running single-disk or multi-disk friction clutch.

The (de-)coupling of the internal combustion engine from the drivetrain may be realized by way of the characteristic converter KW or a dry-running or wet-running launch clutch.

The vehicle transmission 16 may be an automatic transmission or a manually shiftable transmission.

A further electric motor EM2 is connected into the drivetrain between the characteristic converter KW and the vehicle transmission 16. The electric motor EM2 is in the present case arranged coaxially with respect to a transmission input shaft 20 of the vehicle transmission 16.

Alternatively, the electric motor EM2 may also be arranged axially parallel with respect to the transmission input shaft 20, as indicated by the dashed illustration EM2*.

The electric motor EM2 or EM2* may be connected to the transmission input shaft 20 via a transmission 3, 4. The respective transmission 3, 4 may have a single gear ratio or multiple gear ratios.

The electric motor EM1 serves, in the motor mode, firstly for the starting and run-up of the internal combustion engine VM, in particular for realizing an automatic start-stop facility.

Furthermore, "directly bridged launch" can be performed by way of the electric motor EM1 in the generator mode. Here, the power generated by way of the electric motor EM1 is drawn directly by the electric motor EM2 and converted into drive power.

Furthermore, "directly bridged recuperation" may be implemented in the drivetrain. Here, the electric motor EM1 may be operated, with a launch clutch open, in the generator mode or in the motor mode up to a limit rotational speed. In this case, the electric motor EM2 performs the recuperation in the frictionally engaged drivetrain.

Figure 2:
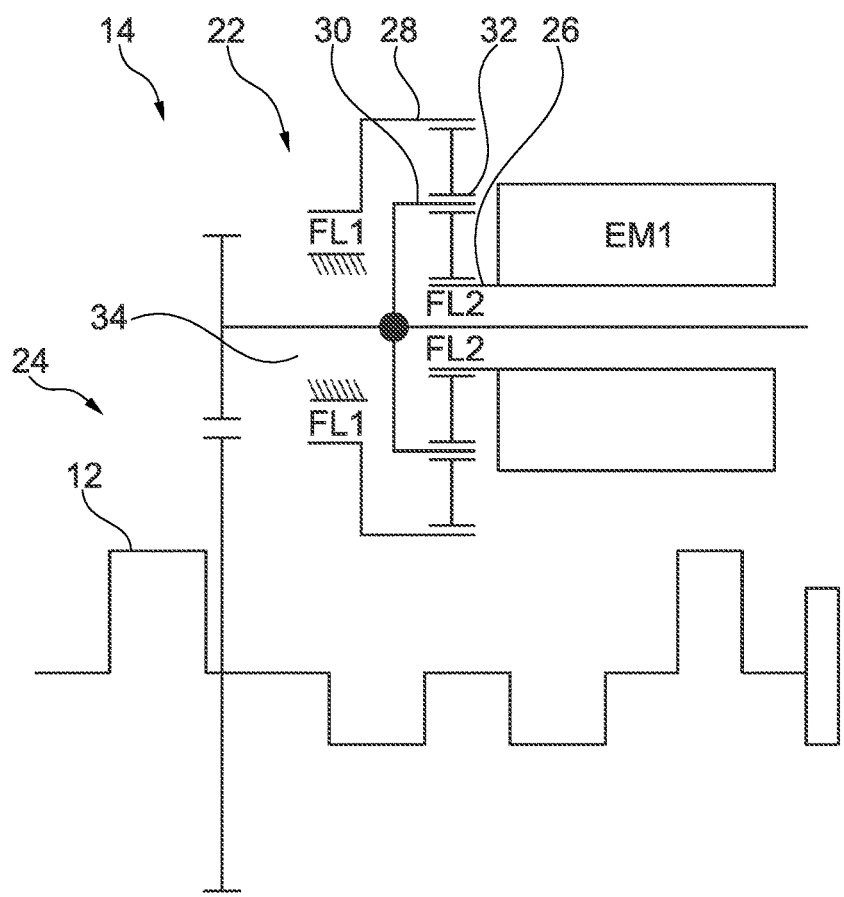
FIG. 2 is a schematic illustration of an automatically shifting transmission of the hybrid drive from FIG. 1.

FIG. 2 shows the automatically shifting transmission 14, which has a planetary transmission 22 and a spur-gear stage 24. The planetary transmission 22 has a first gear ratio for the generator mode and a second gear ratio for the motor mode. The first gear ratio has a transmission ratio of 1, and the second gear ratio has a transmission ratio of 2. The transmission ratio of the spur-gear stage is 2.

The planetary transmission has a sun gear 26, an internal gear 28 and a planet carrier 30, which bears the planet gears 32. The sun gear 26 is assigned a freewheel F12, and the internal gear 28 is assigned a freewheel F11.

In the motor mode, the planet carrier 30 and thus the shaft 34 are driven by way of the planet gears 32 and the sun gear 26.

In the generator mode of the electric motor EM1, the drive is realized via the planet carrier 30, wherein the planet gears 32 are static.

The freewheels F11 and F12 permit reversal of the torque for the generator mode.

Figure 3:
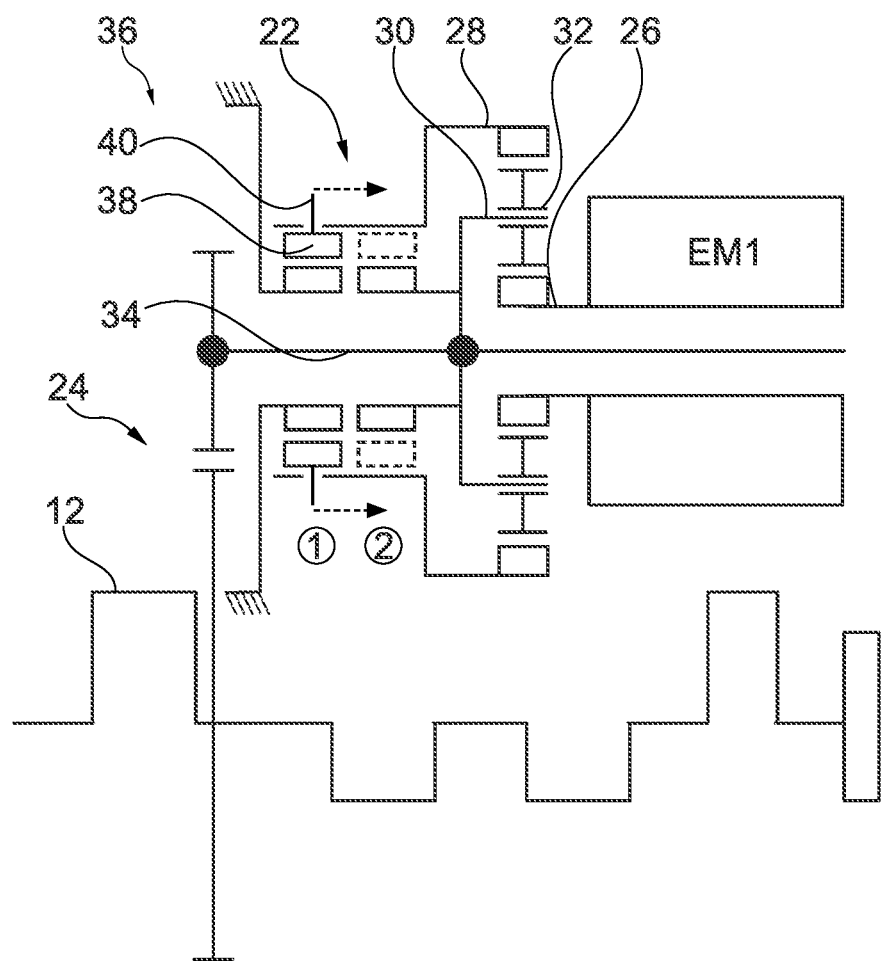
FIG. 3 is a schematic view of a further embodiment of an automatically shifting transmission of the hybrid drive from FIG. 1.

FIG. 3 illustrates a further embodiment of an automatically shifting transmission 36. Alternatively or in addition to the features described with regard to FIG. 2 for the automatically shifting transmission 14, the automatically shifting transmission 36 includes shift elements 38 which are actuable by way of an actuator 40, wherein the actuator 40 is in particular controllable by a control unit (not illustrated).

In a manner dependent on a signal from the control unit, a shift process can be initiated in which the shift elements 38 are moved by the actuator 40 from a first shift position 1 into a second shift position 2.

Here, the transmission ratio of the planetary gear set in the first shift position 1 may be greater than one, whereas in the second shift position 2, the planetary transmission is "blocked", which is associated with a transmission ratio of i=1.

The shift from the first shift position 1 into the second shift position 2 is preferably performed fully automatically, in particular in a manner dependent on an operating parameter of the drivetrain which is predefined in the control unit, such as for example a rotational speed of the internal combustion engine VM.

It is accordingly possible for a shift process from the first shift position 1 into the second shift position 2, and a switch from the motor mode into the generator mode of the electric motor EM1, to be performed as soon as a rotational speed of the internal combustion engine VM predefined in the control unit is exceeded during the run-up of the crank drive 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive for a hybrid vehicle, comprising:
   an internal combustion engine which has a crankshaft;
   an electric motor;
   a characteristic converter;
   a multi-gear ratio vehicle transmission; and
   a further electric motor connected between the characteristic converter and the vehicle transmission, wherein:
   the electric motor is coupled to the crankshaft of the internal combustion engine by way of an automatically shifting transmission.

2. The hybrid drive according to claim 1, wherein
   downstream of the internal combustion engine, there are connected a system for compensating a rotational speed non-uniformity of the crankshaft, the characteristic converter, and the multi-gear-ratio vehicle transmission, for the purposes of transmitting a power of the internal combustion engine to wheels, which are to be driven, of a vehicle.

3. The hybrid drive according to claim 2, wherein the vehicle transmission is an automatic transmission or a manually shiftable transmission.

4. The hybrid drive according to claim 1, wherein
   the further electric motor is arranged coaxially or axially parallel with respect to a transmission input shaft of the vehicle transmission, and
   the further electric motor is couplable via a transmission to the transmission input shaft.

5. The hybrid drive according to claim 1, wherein
   the further electric motor is arranged coaxially or axially parallel with respect to a transmission input shaft of the vehicle transmission, and
   the further electric motor is couplable via a transmission to the transmission input shaft.

6. The hybrid drive according to claim 1, wherein
   the automatically shifting transmission includes a planetary transmission, and/or
   the automatically shifting transmission includes shift elements which are actuable by way of an actuator, wherein the actuator is controllable by a control unit.

7. The hybrid drive according to claim 6, wherein
   the automatically shifting transmission includes an output shaft which is coupled by way of a gearwheel pairing to the crankshaft.

8. The hybrid drive according to claim 6, wherein
   the planetary transmission has a transmission ratio of 1 in a first gear ratio, and a transmission ratio in a range from 1.5 to 2.5 in a second gear ratio.

9. The hybrid drive according to claim 8, wherein the planetary transmission has a transmission ratio in a range from 1.9 to 2.1 in the second gear ratio.

10. The hybrid drive according to claim 1, wherein
    the automatically shifting transmission includes an output shaft which is coupled by way of a gearwheel pairing to the crankshaft.

11. The hybrid drive according to claim 10, wherein the gearwheel pairing is a spur-gear stage.

12. The hybrid drive according to claim 10, wherein the gearwheel pairing has a transmission ratio in a range from 1.5 to 2.5.

13. The hybrid drive according to claim 1, wherein the automatically shifting transmission is a transverse transmission.

14. The hybrid drive according to claim 1, wherein
    a first gear ratio of the automatically shifting transmission has a transmission ratio in a range from 1.5 to 2.5, and
    a second gear ratio of the automatically shifting transmission has a transmission ratio in a range from 3.5 to 4.5.

15. The hybrid drive according to claim 14, wherein
    the first gear ratio of the automatically shifting transmission has a transmission ratio in a range from 1.9 to 2.1, and
    the second gear ratio of the automatically shifting transmission has a transmission ratio in a range from 3.9 to 4.1.

16. The hybrid drive according to claim 14, wherein the transmission ratio of the second gear ratio corresponds at least to 1.5 times the transmission ratio of the first gear ratio.

17. A hybrid drive for a hybrid vehicle, comprising:
    an internal combustion engine which has a crankshaft;
    an electric motor, wherein:
    the automatically shifting transmission includes a planetary transmission, and/or
    the automatically shifting transmission includes shift elements which are actuable by way of an actuator, wherein the actuator is controllable by a control unit, and the planetary transmission includes an internal gear, which is assigned a first freewheel, and a sun gear, which is assigned a second freewheel.

18. A hybrid drive for a hybrid vehicle, comprising:
an internal combustion engine which has a crankshaft;
an electric motor, wherein:
- the electric motor is coupled to the crankshaft of the internal combustion engine by way of an automatically shifting transmission,
- a first gear ratio of the automatically shifting transmission is provided for a motor mode of the electric motor,
- a second gear ratio of the automatically shifting transmission is provided for a generator mode of the electric motor, and
- a control unit switches between the motor mode and the generator mode based on a rotational speed of the internal combustion engine.

\* \* \* \* \*